United States Patent [19]
Harada et al.

[11] 3,932,088
[45] Jan. 13, 1976

[54] FLEXIBLE ANNULAR CORE USED FOR THE PRODUCTION OF HOLLOW TOROIDAL RUBBER SHELLS

[75] Inventors: Jumei Harada; Kenji Tsukamoto, both of Higashi-Murayama; Tetsuhiko Migita, Kodaira; Tsutomu Matsunaga, Higashi-Murayama, all of Japan

[73] Assignee: Bridgestone Tire Company Limited, Tokyo, Japan

[22] Filed: July 31, 1974

[21] Appl. No.: 493,434

[30] Foreign Application Priority Data
Aug. 7, 1973   Japan.................................. 48-87972

[52] U.S. Cl. .................... 425/242; 425/52; 249/65; 249/115
[51] Int. Cl.² .... B29C 1/00; B29C 5/00; B29F 1/00; B29H 5/04; B29H 5/18
[58] Field of Search ............. 425/33, 43, 44, 45, 49, 425/51, 52, 53; 249/115, 134, 65; 18/42 T

[56] References Cited
UNITED STATES PATENTS

| | | |
|---|---|---|
| 2,724,425 | 11/1955 | Ostling............................. 425/45 X |
| 2,937,406 | 5/1960 | Toddy............................... 425/43 X |
| 3,396,221 | 8/1968 | Balle et al........................ 425/53 X |
| 3,459,849 | 8/1969 | De Ronde....................... 4255/45 X |
| 3,525,783 | 8/1970 | Prikkel............................ 249/115 X |
| 3,761,047 | 9/1973 | Mao................................. 249/115 |
| 3,843,292 | 10/1974 | Kitamoto et al..................... 425/43 |

Primary Examiner—J. Howard Flint, Jr.
Attorney, Agent, or Firm—Sughrue, Rothwell, Mion & Zinn

[57] ABSTRACT

A flexible annular core for the production of hollow toroidal rubber shells, particularly pneumatic tires, composed of a pair of bead portions, each of which is composed of beads, a reinforcing layer folded back so as to enclose the beads, and elastomer layers covering the reinforcing layer, and a flexible shell portion composed of the reinforcing layer covered with the elastomer layers and extending across the bead portions. The bead portion of said flexible annular core is composed of the reinforcing layer and the elastomer layer adhered with each other. The flexible shell portion of said core is composed of the reinforcing layer and the elastomer layer not adhered with each other.

9 Claims, 5 Drawing Figures

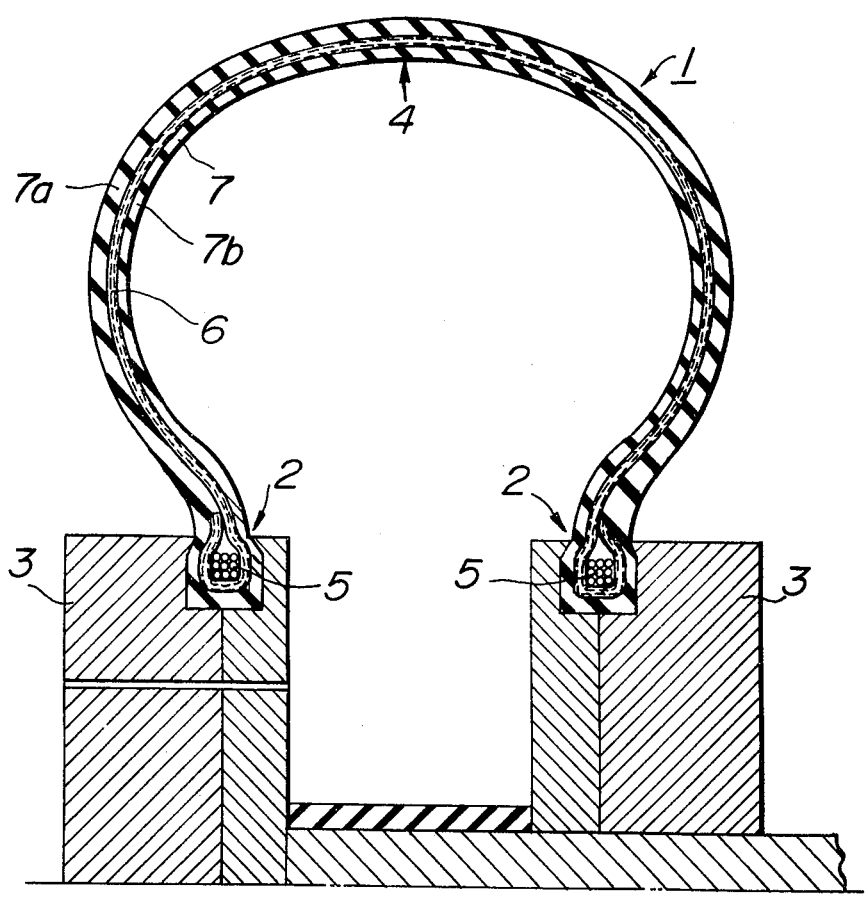
FIG_1

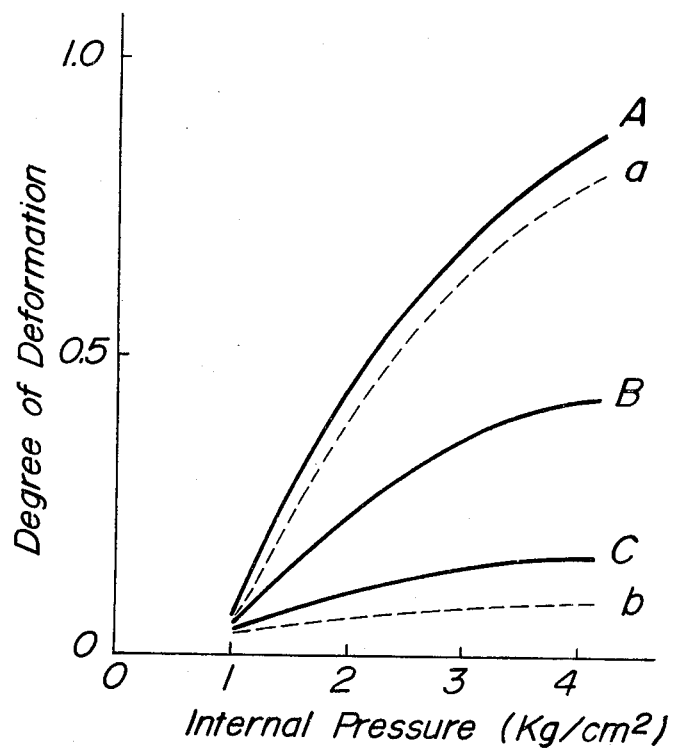
FIG_2

FIG_3a
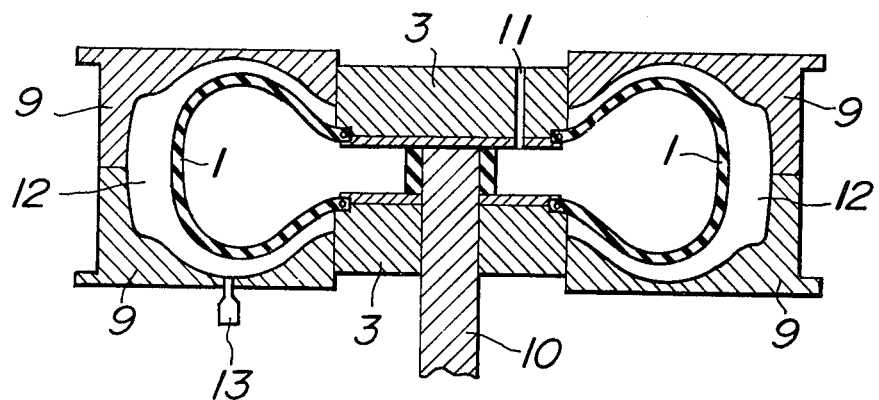
FIG_3b
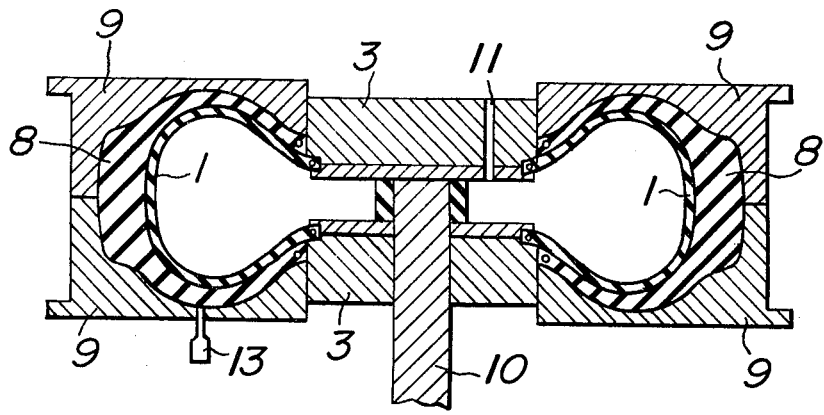

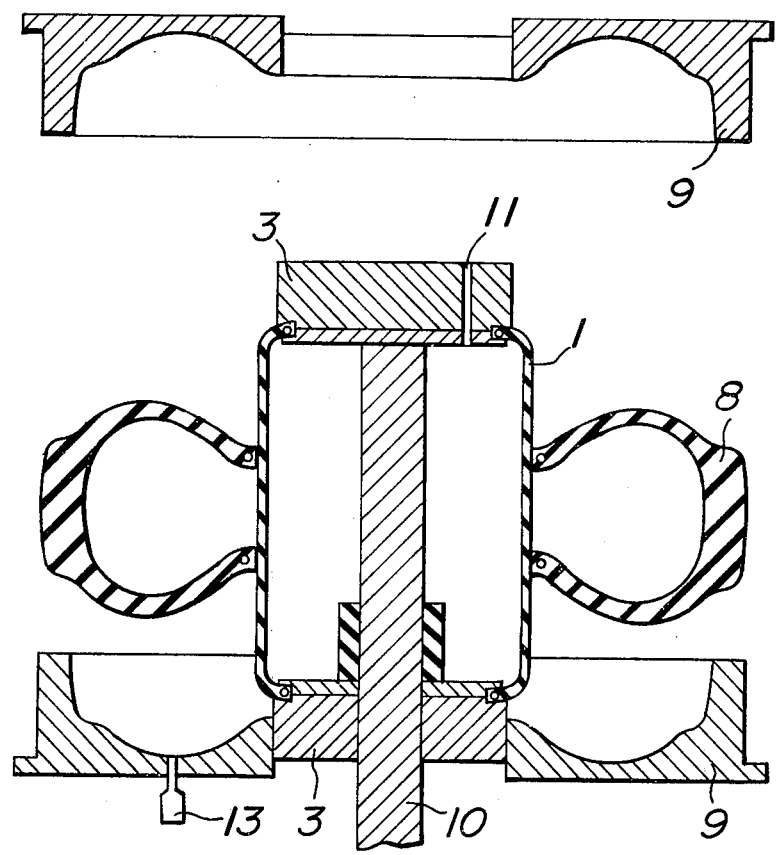
FIG_3c

FLEXIBLE ANNULAR CORE USED FOR THE PRODUCTION OF HOLLOW TOROIDAL RUBBER SHELLS

The present invention relates to a flexible annular core enclosed in a mold to form a cavity, into which a viscous high molecular compound is injected and molded to produce hollow toroidal rubber shells, such as pneumatic tires, bladders for producing pneumatic tire, foamed hollow cores and the like, particularly pneumatic tires.

There have been proposed various cores in order to define the inner surface of a hollow toroidal rubber shell at the production by an injection molding as in the case of the production of pneumatic tires by a casting method.

For example, there has been disclosed a core made of several separable metal sections for the purpose of facilitating its removal from the inside of the molded hollow toroidal rubber shell. However, it is troublesome to assemble and disassemble this core and automatic operation by means of a machine is difficult. Therefore, it is difficult to improve the productivity and further the shape and thickness of the resulting hollow toroidal rubber shell at the joint of different sections are not uniform.

In the core disclosed in Japanese Patent Application Publication No. 4,144/72, a substance admitted into the inside space of the core is kept solid so as to support the flexible shell of the core during a molding operation, and is fluidized after completion of the molding so as to release the molded article. However, in this core, the material to be molded cannot be sufficiently heated under a proper pressure from the core at the molding, and a long curing time is required for the molding. Further, the molded article cannot be released from the mold until the substance admitted into the inside space of the core has been fluidized, and the productivity is low. Moreover, in this case, the vulcanization and curing of the material to be molded are predominantly influenced by the heating from the mold which defines the outer surface of an article to be molded and the degree of curing of the molded article is apt to be nonuniform.

Further, there has been also known a core modified from a molding bladder composed of rubber layers reinforced with cords and rubber layers, said reinforcing cord layers being adhered integrally and the reinforcing cord layer and rubber layer being integrally adhered, and adapted mainly for use in the second building step of a radial tire. However, this core has the reinforcing cord layers fixed with each other and the reinforcing cord layer and rubber layer fixed with eath other so as to make the core resistant against pressure and heat at the injection and curing, and it is difficult to move the relative position between the reinforcing cord layers and between the reinforcing cord layer and rubber layer.

That is, when it is intended to deform the shape of the core by changing the distance between a pair of bead portions, which is formed in the innermost circumference of the core and by changing the internal pressure of the core, the reinforcing cord layer restrains and prevents the core from being deformed freely in shape. Accordingly, the inner surface of a hollow toroidal rubber shell to be molded is limited in shape and further the molded shell is difficult to be released from the mold, and the productivity becomes low.

Moreover, the shape of the core can be fairly deformed by applying an extremely high pressure to the interior of the core or by enlarging the distance of the bead portions of the core with an extremely strong force. In this case, the reinforcing cord layer is peeled off from the rubber layer to cause breakage of the core, and the durability of the core becomes poor.

An object of the present invention is to provide a flexible annular core for the production of hollow toroidal rubber shells, which can obviate the above described drawbacks of the conventional cores.

The present invention provides an improved core, which can produce hollow toroidal rubber shells, for example, cast tires, having a desired inner surface in a short period of time by injecting and curing a viscous high molecular compound, and which can be easily released from the molded shells and can be used repeatedly for a very large number of times.

A feature of the present invention is the provision of a flexible annular core used for the production of hollow toroidal rubber shells, comprising a pair of bead portions and a flexible shell portion, each of said bead portions having beads, which are looped in a circumferential direction of the core in an inextensible fashion, and at least one reinforcing layer reinforced with cords inextensible in the lengthwise direction thereof and folded back so as to enclose the beads and elastomer layers covering the reinforcing cord layer, said flexible shell portion being composed of said reinforcing layer and said elastomer layers covering both sides of the reinforcing layer and extending across a pair of the bead portions, said core being fixed at its bead portions to movable ring molds which can be moved to and fro and being deformed by the movable ring molds so as to deform repeatedly the flexible shell portion in a reversible manner between a cylindrical shape at the largest distance of the movable ring molds and a toroidal shape at the shortest distance of the molds, said bead portions fixed to the movable ring molds being composed of said reinforcing layers adhered with each other and said reinforcing layer and said elastomer layer adhered with each other to form an integral body, and said flexible shell portion being composed of said reinforcing layers not adhered with each other and said reinforcing layer and said elastomer layer not adhered with each other.

For a better understanding of the invention, reference is taken to the accompanying drawings, wherein:

FIG. 1 is a radial sectional view of a core according to the present invention;

FIG. 2 is a graph showing relations between the internal pressure and the degree of deformation of a core at various cord angles of the reinforcing layer; and FIGS. 3a, 3b and 3c are sectional views of a mold assembly showing the steps for producing a cast tire by using a core of the present invention.

Referring to FIG. 1, a pair of bead portions 2 of a core 1 are fixed to respective movable ring molds 3, which allow the bead portions 2 to move to and fro. The numeral 4 represents a flexible shell portion of the core 1 toroidally deformed by the approach of the movable ring molds 3 and 3. The numeral 5 represents beads which are embedded in the bead portions 2 and are inextensible in a circumferential direction of the core 1. The numeral 6 represents a reinforcing layer. Both ends of the reinforcing layer 6 are folded back in the bead portions 2 so as to enclose the beads 5 from the inner side to the outer side thereof. The numeral 7 represents an elastomer layer composed of an outer layer 7a and an inner layer 7b adhered to the outer and inner surfaces of the reinforcing layer 6 respectively, and extending across the bead portions 2 and 2.

The elastomer layer 7 is made of rubber, rubbery plastic and the like. It is preferable that the materials to be used in the elastomer layer 7 has a heat resistance which can resist the temperatures at the injection and curing of high polymer molecular compound, and at the heating of the interior of the core under pressure, and has a heat aging resistance at the elongation of the core, and further has a creap resistance so that the elongation of the core due to the reversible deformation between the cylindrical shape and the toroidal shape of the core (even when an ordinary passenger car tire is produced, the core is elongated to about 200%) can be easily recovered, and further has a resistance against the penetration of pressurized heating fluid. For example, butyl rubber vulcanized with phenolic resin is advantageously used as the elastomer layer 7. Particularly, since the outer elastomer layer 7a is directly brought into contact with a viscous high molecular compound to form the inner surface of a hollow toroidal rubber shell, it is necessary that the layer 7a is made of a material which can be easily released from the cured high molecular compound. While, since the inner elastomer layer 7b is directly brought into contact with a pressurized heating fluid, it is necessary that the layer 7b is made of a material which is not deteriorated by the heating fluid.

Both ends of the reinforcing layer 6 are folded back so as to enclose the beads 5 and are firmly fixed in the bead portions 2 together with the beads. The layer 6 extends across the beads 5 and 5 to form the flexible shell portion 4 of the core 1 together with the elastomer layer 7.

The cord of the reinforcing layer 6 may be made of organic fibers for tire carcass cords, such as rayon, nylon, polyester, vinylon, etc., and/or inorganic fibers for tire carcass cords, such as glass fiber, carbon fiber and steel wire, etc. As the reinforcing layer 6, tire fabric is preferably used. The layer 6 may be of single layer or multiple layers depending upon the reinforcing purpose.

In the core of the present invention, both the reinforcing layers 6 on the one hand and the reinforcing layer 6 and the elastomer layer 7 on the other hand are adhered to each other only at the bead portions 2, that is, only at the end portions of the layers 6 and 7 wherein these layers are fixed to the movable ring molds 3, and at least one interface between the above layers in the major part of the flexible shell portion 4 is not adhered.

In order to reinforce the interfaces between the reinforcing layers 6 and between the reinforcing layer 6 and the elastomer layer 7 with the reinforcing action of the reinforcing layer 6, both the reinforcing layers 6 and the reinforcing layer 6 and elastomer layer 7 must be adhered with each other in the portion wherein these layers are fixed to the movable ring molds 3. However, at least one interface between the reinforcing layers 6 and between reinforcing layer 6 and the elastomer layer 7 must not be adhered in the region, wherein the outer surface of the flexible shell portion 4 is brought into contact with the inner surface of the hollow toroidal rubber shell to be molded, except its bead portions, so that the core 1 can be reversely deformed easily between the cylindrical shape and the toroidal shape.

Such non-adhered interface can be advantageously formed by previously applying, for example, on the surface of the reinforcing layer 6 liquid lubricants, such as silicone grease, Teflon grease and the like, or powdery lubricants, such as graphite, molybdenum disulfide, calcium stearate and the like. Due to the lubricating action of these lubricants on the interfaces between the reinforcing layers 6 and/or between the reinforcing layer 6 and the elastomer layer 7, the core 1 can be deformed more freely. Alternatively, the reinforcing layer 6 and the elastomer layer 7 can be also made into non-adhesive and lubricating state by compounding powders of molybdenum disulfide, calcium stearate, graphite, etc. having lubricating action to the elastomer layer 7. Both the reinforcing layers 6 and the reinforcing layer 6 and elastomer layer 7 can be adhered with each other by using conventional adhesive or by carrying out vulcanization adhesion.

The beads 5 may be made of metallic wires, as in the case of conventional automobile tires. It is not always necessary to use the metallic wires as such. For example, the metallic wires can be used in the form of cables or cords. It is also possible to form the bead with non-metallic materials, for example, inorganic fibers, such as glass fibers and the like, organic fibers, such as nylon, polyester and the like, composite materials, such as FRP and the like, and elastomers having a high hardness. That is, any materials capable of bearing the internal pressure of the core 1 can be used as the beads 5.

Relations between the inner pressure and the degree of deformation of the core 1 shown in FIG. 1 at various cord angles of the reinforcing layer were measured in following manner. In the core shown in FIG. 1, the reinforcing layer 6 was made of two tire fabric layers reinforced with rayon cords. Both the reinforcing layers 6 and the reinforcing layer 6 and elastomer layer 7 were made non-adhesive with each other by means of silicone grease. The bead portions 2 and 2 of the core 1 were fixed to the movable ring molds 3 and 3, and then distance of the molds 3 and 3 was shortened so as to deform the core into a toroidal shape and a relation between the internal pressure and the degree of deformation of the core 1 was measured. This test was carried out with respect to cores having various cord angles of the reinforcing layer. The results thus obtained are shown in FIG. 2.

The degree of deformation of the core, which is shown in the ordinate of FIG. 2, is calculated from the following formula:

$$\text{Degree of deformation} = \frac{\text{maximum radius of core - initial radius of core}}{\text{distance between movable ring molds}}$$

In the above formula, the initial radius of core is a radius of a core to be tested when the core forms a cylindrical shape.

The same test was effected with respect to a conventional core, wherein reinforcing layers 6 are composed of two layers of the same tire fabric as used in the above test, but both the reinforcing layers 6 and the reinforcing layer 6 and elastomer layer 7 are wholly adhered with each other in both the bead portions 2 and the flexible shell portion 4. The results thus obtained are also shown in FIG. 2.

In FIG. 2, the curves A, B and C show the behaviors of the core of the present invention when the cord angles of the reinforcing layer are 90°, 60° and 30°, respectively. The curves $a$ and $b$ show the behaviors of the conventional core when the cord angles are 90° and 60°, respectively.

It can be seen from the curves A, B and C of FIG. 2 that, in the cores of the present invention, even when the cord angle of a core is small, the degree of deformation of the core is relatively high. That is, the radial sectional shape of the core changes gradually from circle to oval as the decrease of the cord angle from 90°. While, as seen from the curves $a$ and $b$ of FIG. 2, in the conventional cores, when the cord angle of a core is a little smaller than 90°, the degree of deformation of the core becomes considerably low. That is, when the cord angle of the core is decreased from 90°, the radial sectional shape of the core changes rapidly from circle and becomes flat. Therefore, the conventional core is not suitable for the formation of cores having various toroidal shapes.

The core A of the present invention and the conventional core $a$ were repeatedly subjected to reversible deformations between the cylindrical shape and the toroidal shape respectively until the cores were broken, and the number of repeated times of deformation was measured. The results thus obtained are shown in the following table.

|  | Number of repeated times of deformation |
| --- | --- |
| Core A of the present invention | 20,000 |
| Conventional core a | 15,000 |

It can be seen from the above table that the cords of the reinforcing layer of the conventional core $a$ fatigues considerably rapidly as compared with that of the core A of the present invention. Therefore, the durability of the conventional core $a$ is considerably lower than the core A of the present invention.

FIGS. 3a, 3b and 3c show radial sectional views of a mold assembly showing the steps for producing a cast tire by using the core 1 according to the present invention. In the figures, the numeral 8 represents a cast tire, and the numeral 9 represents a separable outer molds.

Referring to FIGS. 3a–3c, a process for producing the cast tire 8 will be explained. The molds 9 are tightly closed, and the distance between movable ring molds 3 and 3 is kept at a given distance by a piston 10. Pressurized heating fluids, such as air, steam, mineral oil, low melting point metal and the like, are injected and filled in the inside space of the core 1 through a passage 11 formed in the movable ring molds 3 to keep the shape of the core 1 to the same toroidal shape with the inner shape of a tire to be cast. Thus, a cavity 12 having the same shape as the outer and inner shapes of a tire to be cast is formed by the outer molds 9 and the core 1.

The outer shape of the core 1, that is, the inner shape of a tire to be cast, is highly influenced by the injection pressure of the viscous high molecular compound and by the internal pressure of the core 1, and therefore the internal pressure of the core 1 is preferred to be sufficiently higher than the injection pressure.

Then, a viscous high molecular compound is injected from an injecting gate 13 formed in the molds 9 into the cavity 12 and filled therein as shown in FIG. 3b. Then, the high molecular compound is cured by heating from both the molds 9 and the core 1.

After the viscous high molecular compound has been cured to form a cast tire, the separable outer molds 9 and 9 are opened, and then the fluid filled in the core 1 is exhausted through the passage 11, and the distance of the movable ring molds 3 and 3 are enlarged by means of a piston 10 to deform the core 1 into the cylindrical shape as shown in FIG. 3c. The resulting cast tire 8 can be easily taken out from the molds 9 by moving the tire along the periphery of the core 1 in the axial direction of the tire.

As described above, the core according to the present invention can be smoothly deformed between the cylindrical shape and the toroidal shape, and is excellent in the durability and releasability. Further, raw material of high molecular compounds can be fully heated and cured at the production of hollow toroidal rubber shells by the use of the core. Accordingly, hollow toroidal rubber shells can automatically be produced in a simple process and in a high productivity while ensuring the dimension and the degree of curing of the resulting hollow toroidal rubber shells.

What is claimed is:

1. A flexible annular core used for the production of hollow toroidal rubber shells comprising, a pair of bead portions and a flexible shell portion, each of said bead portions having beads which are looped in a circumferential direction of the core in an inextensible fashion, at least one reinforcing layer reinforced with cords inextensible in the lengthwise direction thereof and folded back so as to enclose the beads, said flexible shell portion being comprised of said reinforcing layer and elastomer layers covering both sides of the reinforcing layer and extending across a pair of the bead portions, said core being fixed at its bead portions to movable ring molds which can be moved to and fro and deformed by the movable ring molds so as to deform repeatedly the flexible shell portion in a reversible manner between a cylindrical shape at the largest distance of the movable ring molds and a toroidal shape at the shortest distance of the molds, said bead portions fixed to the movable ring molds being composed of said reinforcing layers adhered with each other and said reinforcing layer and said elastomer layer adhered with each other to form an integral body, and said flexible shell portion being composed of said reinforcing layers not adhered with each other and said reinforcing layer and said elastomer layer not adhered with each other.

2. A core accoding to claim 1, wherein the surface of said reinforcing layer of the flexible shell portion is applied with liquid lubricant or powdery lubricant.

3. A core according to claim 1, wherein said elastomer layer of the flexible shell portion is compounded with powders having lubricating action.

4. A core according to claim 1, wherein said reinforcing layer is tire fabric reinforced with organic fiber cords or inorganic fiber cords.

5. A core according to claim 1, wherein said elastomer layer is butyl rubber vulcanized with phenolic resin.

6. A core according to claim 1, wherein said hollow toroidal rubber shell is pneumatic tire.

7. A core according to claim 2, wherein said liquid lubricant is silicone grease or Teflon grease.

8. A core according to claim 2, wherein said powdery lubricant is graphite, molybdenum disulfide or calcium stearate.

9. A core according to claim 3, wherein said powders having lubricating action are powders of molybdenum disulfide, calcium stearate or graphite.

* * * * *